March 17, 1970 P. T. MATTIMOE ET AL 3,501,281
METHOD OF FORMING AN INSULATED SHAPING
SURFACE ON A BENDING MOLD
Filed Oct. 6, 1965

INVENTORS
Paul T. Mattimoe and
BY William L. Elton

Nobbe & Swope
ATTORNEYS

United States Patent Office 3,501,281
Patented Mar. 17, 1970

3,501,281
METHOD OF FORMING AN INSULATED SHAPING SURFACE ON A BENDING MOLD
Paul T. Mattimoe, Toledo, and William L. Elton, Maumee, Ohio, assignors to Libbey-Owens-Ford Glass Company, Toledo, Ohio, a corporation of Ohio
Filed Oct. 6, 1965, Ser. No. 493,408
Int. Cl. C03b 23/02
U.S. Cl. 65—288
13 Claims

ABSTRACT OF THE DISCLOSURE

A mold for bending glass sheets that is made up of a rigid part having a surface conforming generally in contour to the curvature desired in a finished bent glass sheet, an insulating refractory cover on this generally conforming surface that has an exposed surface that accurately conforms to the desired curvature, and a layer of adhesive providing a compensating "glue line" between the rigid part and the cover; together with a method of producing such covered mold parts which involves supporting a flexible refractory cover with its supported surface accurately conforming to the desired curvature, applying a silicone polymer to the unsupported surface, pressing the generally conforming rigid mold part into and then curing the polymer.

---

The present invention relates to bending molds and more particularly to a novel method of forming an insulated shaping surface on a bending mold.

Curved sheets of glass are widely used as glazing closures particularly as windows in vehicles such as automobiles or the like. The styling of the present-day automobiles dictates that the curved sheets must be bent to rather precisely defined curvatures which are determined by the size and shape of the opening in which they are to be mounted.

One way of commercially producing curved glazing closures of the above character, is to heat flat glass sheets to a temperature corresponding substantially to the softening point of the glass and to then press or shape the softened sheets between complemental shaping surfaces formed on mold parts and conforming to the desired curvature of the finished sheets.

However, this procedure introduces certain problems. First, when brought into contact with the heated sheets, the mold parts, which are usually constructed of metal or a similar material capable of withstanding the stresses encoutered during the bending operation, are relatively cool as compared to the glass which at this point, has been heated to a temperature of approximately 1250° F. Upon contacting the sheets, the cool shaping surfaces tend to fuse to the glass or to cause chill cracking in the contact areas of the heated sheet. This problem has been partially overcome by constructing one mold part in the form of a ring thereby reducing the area of contact between the shaping surface and the sheet and by insulating the shaping surfaces of both mold parts with a suitable heat-resistant cover which is cemented by a suitable adhesive or otherwise secured to the mold parts. However, due to the nature of the bending operation and the high temperatures involved, the mold parts, particularly the ring-type mold part which has less mass than a solid mold part, are heated to comparatively high temperatures. This heat adversely affects the insulating cover and causes the adhesive securing the cover on the mold part to break down permitting the cover to pull away from the mold part.

The primary object of the present invention therefore is to provide an improved mold for bending glass sheets which is not adversely affected by prolonged exposure to elevated temperatures.

Another object is to provide a novel method of forming an accurately contoured, insulated shaping surface on a bending mold that will not deteriorate at elevated temperatures.

Other objects and advantages of the invention will become more apparent during the course of the following description when read in connection with the accompanying drawings.

In the drawings, wherein like numerals are employed to designate like parts throughout the same:

In the production of curved glass sheets in relatively large quantities, such as would be encountered in the commercial production of glazing closures for automobiles and the like, the sheets are heated, bent and tempered in a substantially continuous procedure. Usually the sheets of glass are moved successively along a path through a heating section, a bending section and a tempering section, which sections are contiguous so that an individual sheet upon being moved through one section passes immediately into and through the following section. The heat imparted to the sheet to bring it to the proper bending temperature is utilized in the tempering process.

Figure 1:
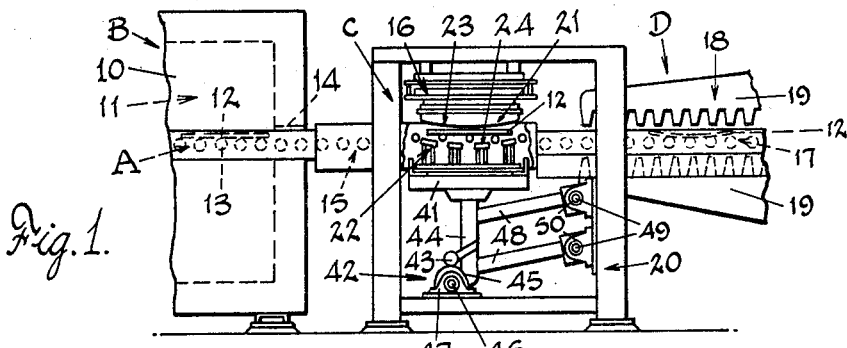
FIG. 1 is a fragmentary side elevational view of a bending and tempering apparatus, with parts broken away, incorporating the novel features of the present invention.
Figure 3:
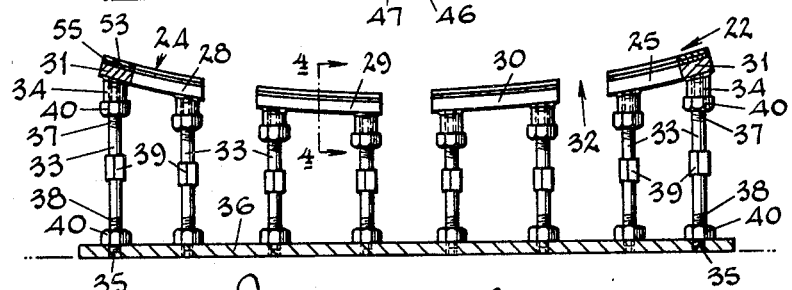
FIG. 3 is an enlarged sectional view taken along lines 3—3 of FIG. 2.

For purposes of illustration, there is shown in FIG. 1 a bending and tempering apparatus having the present invention incorporated therein. The apparatus is capable of producing bent and tempered glass sheets by a continuous commercial process similar to that described above and includes a conveyor system A capable of carrying sheets along a predetermined path, through a heating section B for heating the sheets to the desired temperature, a bending section C for forming sheets to the desired curvature and a cooling section D for rapidly reducing the temperature of the heated sheets to produce the desired temper therein.

In the illustrative embodiment, the heating section B includes a tunnel-type furnace 10 having a heating chamber 11 defined by refractory walls and heated by suitable heating devices (not shown). The flat sheets of glass 12 are loaded onto a roll-type conveyor 13, which is part of the conveyor system A, at the entrance end (not shown) of the heating chamber 11 and are passed through the heating chamber wherein the sheets are heated to substantially the softening point of the glass. The heated sheets emerge from the exit end of the furnace through an opening 14 where they are received on a second roll-type conveyor 15, which is also part of the conveyor system A, and are moved into the bending section C to be formed to the desired curvature by the bending means 16.

After being bent, the sheets continue their movement onto a third roll-type conveyor 17 which is disposed in end-to-end aligned relation with the conveyors 13 and 15. Then the sheets are moved through the cooling section D which includes the cooling means 18. In the present instance, the cooling means includes blast heads 19 disposed above and below the third roll-type conveyor 17 and operable to direct cooling gases, such as air, toward and against the opposite surfaces of the heated sheets moving along the conveyor.

In the illustrated embodiment, the bending means is mounted on a framework 20 and includes male and female mold parts 21 and 22 which are mounted for relative movement towards and away from each other in a manner to bring opposed complemental sheet engaging surfaces 23 and 24 into pressing engagement with the opposite surfaces of a glass sheet. Although either of the mold parts may be mounted for relative movement, in the present instance, the male mold part is fixedly secured to the framework above the path of the moving sheets formed by the conveyor system A and the female mold part is mounted on the framework for movement from a position below the path to a position above the path and in close proximity to the male mold part. In this manner, as a heated sheet is carried by the conveyor into the bending section C and between the mold parts it is raised by the female or lower mold part 22 and carried into pressing engagement with the male or upper mold part 21 to form the sheet to the desired shape, after which it is returned to the conveyor and moved into the cooling section D.

The surface 23 of the male mold part is a continuous surface adapted to engage the entire upper surface of the sheets. The female mold part comprises an open ring-type structure which has an upwardly directed face forming the surface 24 for engaging only the marginal edge portions of the sheet to avoid marring the portions of the undersurface of the sheets which lie within the viewing area of the finished unit.

In order to allow the female mold part to pass between the rollers of the conveyor 15, the ring-type structure includes a plurality of sections 25, 26, 27, 28, 29 and 30, each comprising a metallic bar 31 with the bars arranged in end-to-end relation to form a substantially trapezoidal configuration. The adjacent ends of the bars are spaced from each other a sufficient distance 32 to allow a roller of the conveyor 15 to pass therebetween with the upwardly directed faces arranged to form the surface 24 conforming in outline and curvature to the glass sheets when bent.

Although the configuration of the ring-type structure is shown as being generally trapezoidal, it is readily apparent that the configuration and size of this member is determined by the size and shape of the glass sheet to be bent and therefore various sizes and configurations are considered within the scope of the invention.

Each of the bars 31 are held in position by one or more rods 33 having one end received in a tapped opening in a boss 34 secured to the lower surface of the bar and the opposite end threaded into tapped openings 35 in a base 36. The opposite ends of the rods 37 and 38 are provided with threads extending in opposite directions so that rotation of the rods in one direction will raise the bar away from the base while rotation in the opposite direction will lower the bar toward the base. In this manner each of the bars may be individually adjusted to bring the shaping surface into the desired position. To facilitate rotating the rods 33, a squared enlarged portion 39 is provided immediate the ends of the rods, which portion is adapted to receive a wrench or similar tool. Once the bars 31 are in proper adjustment, the rods 33 are locked against further rotation by nuts 40 threaded upon the opposite ends of the rods and bearing against either the base 36 or the boss 34.

The plate or base 36 carrying the plurality of bars rests on and is secured to a carriage 41 which supports the female mold part for movement toward and away from the male mold part. The raising and lowering of the female mold part is accomplished by an actuating mechanism coupled to the carriage which supports the mold part. While many different actuating mechanisms could be employed to impart the desired reciprocal motion to the female mold part, in the illustrated embodiment a simple cam and follower mechanism 42 is shown. Although only one such mechanism can be seen in FIG. 1, two are utilized with one being disposed on each side of the path of movement of the glass sheets. Since the mechanisms are identical in construction, a detailed description of one will suffice for the present purposes.

The actuating mechanism 42 includes a cam follower 43 coupled to the carriage by a bar 44 depending from the lower surface thereof and riding on a disc cam 45, shaped in the usual manner, to impart the desired sequence of motion to the follower and thus the carriage. The cam is fixedly secured on a shaft 46 journaled at its opposite ends in bearing blocks 47 mounted on the framework 20 and driven by a suitable power source (not shown).

The carriage and female mold part are guided for movement between the raised and lowered positions by cross members 48 having one end fixed to shafts 49 journaled in bearing blocks 50 mounted on the framework. The opposite ends of the cross members 48 are pivotally secured to the bar 44 depending from the carriage 41. In this manner, the cross members 48, bar 44 and the vertically extending posts of the framework 20 form a four-bar linkage system for guiding the carriage and female mold part for vertical movement into engagement with the male mold part.

Suitable automatic means may be employed for raising and lowering of the female mold part. For example, the drive means (not shown) for the actuating mechanism 42 may be operated in response to signals emanating from a sensing device that is positioned in the entrance area of the bending section to thereby rotate the disc cam and raise the carriage and female mold part as each sheet passes between the bending means 16 with the cross members 48 guiding the carriage and mold along a predetermined substantially vertical path. This action will carry the moving sheet from the conveyor rolls 15, press it between the surfaces of the mold parts and thereafter return the bent sheet to the conveyor rolls.

As noted above, in the bending sequence, when the mold parts engage the surfaces of the sheets which are then at the elevated temperature, the relatively cool surfaces have a tendency to fuse to the contacted areas of the heated sheet. Furthermore, the extreme temperature differential between the mold parts and the heated sheets has adverse effects on the glass causing chill cracks or other imperfections in the contact areas. To prevent fusing of the mold to the sheet and to reduce chill cracking of the glass, the sheet engaging surfaces of the mold parts are covered with a heat-resistant and insulating material which reduces the rate of heat transfer between the mold parts and the sheets.

It is, of course, important that the shaping surface of the male and female mold parts be as close as possible to exact conformity with each other and with the curvature desired in the finished bent sheet since any nonconformity between the shaping surfaces can, among other things, cause breakage of the sheets during the bending process and improperly curved sheets. Variations in thickness of the insulating cover and the nonuniformity of the metal face of the mold parts have been observed as some of the factors contributing to a nonuniform shaping surface in the finished mold parts.

Also as indicated above, in the commercial production of curved glazing closures by the procedure outlined above, the glass sheets are heated to a temperature of approximately 1250° F. By absorbing heat from the sheets, the mold parts, particularly the ring-type female mold part which is in contact with the heated sheet during the major portion of the bending operation, are heated to relatively high temperatures which tend to adversely affect the mold parts. This condition is further aggravated by the fact that the female mold part is divided into a number of relatively small sections which, due to their small mass, absorb heat from the mold at a relatively rapid rate. For example, it has been observed that during the bending operation, the sections making up the female mold part reach temperatures as high as 560° F. At these temperatures, conventional adhesives of the type used to bond the insulating cover to the metal shaping surfaces of the mold part tend to break down or "burn out," permitting the cover to pull away from the shaping surface of the mold part. Of course, any imperfection in the shaping surface of the mold parts would require a complete reworking of the mold part to restore it to proper condition and this reworking is a time consuming and costly operation.

According to the present invention, the female mold part is constructed in a novel manner to provide an accurately contoured shaping surface having an insulating cover which is able to withstand prolonged exposure to the highly heated glass sheets, which cover is securely bonded to the mold part by an adhesive capable of withstanding the high temperatures without failing or "burning out." To this end, the invention contemplates using a high molecular weight silicone elastomer for bonding the insulated cover to the female mold part, which material retains its adhesive qualities over a wide range of temperatures, and assembling the cover, adhesive and mold part in such a manner as to ensure proper contour of the shaping surface of the mold part.

In producing the novel mold part according to the invention, a master form or model 51 is formed with a shaping surface 52 which is accurately contoured and dimensioned to the desired curvature of the sheet when bent. A plurality of strips 53 of insulating covering material are secured to the shaping surface of the model by suitable means, such as adhesive tape 54, and are arranged to correspond to the outline of the ring structure of the mold to be covered.

Although various types of insulating covering material may be utilized, it has been found that a high temperature ceramic fiber product produces the most desirable results. Preferably, in accordance with another aspect of the invention, the insulating cover is formed of short fibers of high-purity alumina and silica which are formed into a mat and thereafter rigidified by impregnating the mat with a suitable rigidizer, such as a colloidal silica.

The next step in producing the mold is to clean the metal shaping surface of the female mold part which is best accomplished by sandblasting. The exposed surfaces of the cover and the shaping surface of the mold are then primed with a suitable material to increase the adhesion between the surfaces and the adhesive. A number of different primers would serve this purpose such as, for example, vinyltriethoxysilane or vinyltrimethoxyethoxysilane. A solution of this material comprises 5 parts by weight of the silane and 95 parts by weight of 95% ethyl alcohol and is painted on the surfaces by either brushing or spraying and allowed to dry.

An adhesive which may be employed for bonding the insulating cover to the female ring mold according to the invention, comprises a reactive silicone polymer, such as a di-methyl polysiloxane, which can be converted to an elastomer by addition thereto of suitable catalysts. Among the adhesives contemplated is a room temperature vulcanizing silicone rubber which can be cured by the addition of metal organic compounds, such as di-butyl tin laurate or lead octoate. Another adhesive which shows considerable promise is a high temperature curing silicone rubber consisting of a vinyl-containing methyl silicone gum stock catalyzed with organic peroxides, such as di-tert butyl peroxide. This adhesive should be cured at a temperature of aproximately 340° F. for a period of two hours. It is also contemplated to use various other di-methyl polysiloxanes having a small number of phenyl or vinyl groups on the silicone polymer chain.

After thorough mixing, the adhesive may be applied directly to the surfaces to be bonded. However, it has been found that such a mixture is too fluid for easy application to any degree of thickness. Therefore a thickening agent is preferably added to produce a heavy, putty-like mass. Any number of thickening agents can be used to produce the desired consistency of the adhesive. However, it is desirable to select a thickening agent which improves the heat stability of the cured compound. One of the agents which has produced extremely desirable results is finely divided silica. Another product which has been very satisfactory for obtaining the desired flow properties as well as improving the heat stability of the cured compound is milled fiber glass.

After the adhesive and thickening agent have been thoroughly mixed to produce the desired consistency, a layer 55 of the mixture is applied to the primed surface of the insulating cover to a thickness on the order of $3/16$ to $1/4$ inch. The female mold part is than forced into pressing engagement with the adhesive mixture by means of a press member 56 to give a "glue line" between the surface of the ring and the cover of between $1/16$ and $1/8$ inch in thickness. The thickness of the finished "glue line" will vary to compensate for any irregularities in the mold part and in the thickness of the strips 53.

Figure 4:
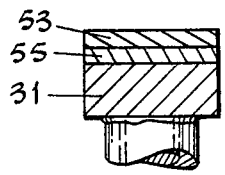
FIG. 4 is a sectional view taken along lines 4—4 of FIG. 3.
Figure 2:
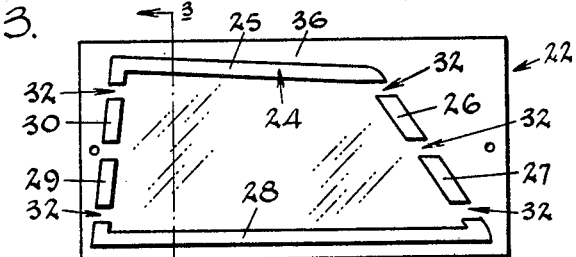
FIG. 2 is a plan view of a bending mold part constructed in accordance with the invention.
Figure 5:
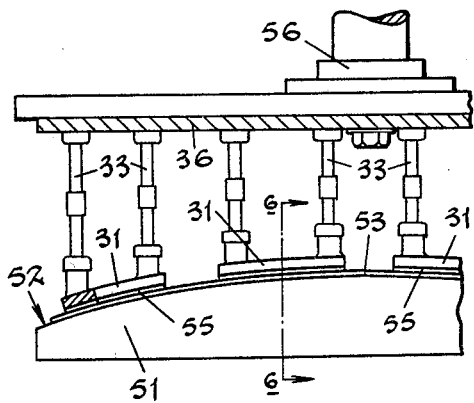
FIG. 5 is a side elevational view partially in section showing a platen for forming the mold of the desired curvature.
Figure 6:
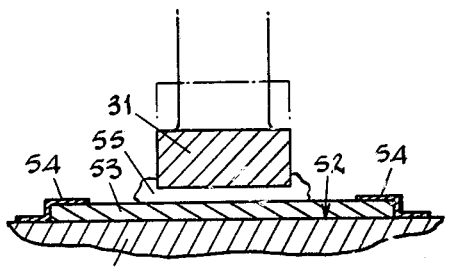
FIG. 6 is an enlarged fragmentary view taken along lines 6—6 of FIG. 5.

The adhesive is then cured and the female mold part is removed from the pressing member after which the excess covering material and adhesive is trimmed off to produce a finished ring structure, such as shown in cross-section in FIG. 4.

Specific examples of the adhesive used to produce the mold part according to the invention are as follows:

EXAMPLE I 0.5 part by weight of a di-butyl tin laurate catalyst was thoroughly mixed with 99.5 parts by weight of RTV–60 silicone compound. RTV–60 is a di-methyl polysiloxane sold by the General Electric Company, Schenectady, N.Y. A thickening agent comprising 80 parts by weight of finely divided silica having a mesh size ranging from 200 to 400 was added to the adhesive to produce a putty-like mass.

This adhesive was used to form ring-type female mold parts by the above procedure. To accelerate curing the adhesive, heat lamps were applied for a period of two to three hours. As a further insurance of complete cure of the adhesive, the mold parts were stored at room temperature for a period of twenty-four hours. The mold parts were then used in the continuous production of curved glazing closures during which the mold parts attained temperatures of approximately 560° F. Results have shown that the novel mold parts had extremely uniform and smooth shaping surfaces which were capable of continued operation at these temperatures without damage to the shaping surface of the mold part. Preliminary results have shown that using mold parts constructed in accordance with this procedure has reduced replacement and repair of the parts by as much as 40% which necessarily resulted in higher furnace yields due to fewer mold part changes.

EXAMPLE II 0.8 part by weight of di-tert butyl peroxide was mixed with 100 parts by weight of a vinyl-containing silicone gum stock and a thickening agent or filler of 40 parts by weight of finely divided silica was added to produce a heavy, putty-like mixture.

This adhesive was used to form ring-type mold parts by the procedure set forth above. The adhesive was cured by placing the mold part in an oven at a temperature of 340° F. for a period of two hours.

Now it will be appeciated that the novel sectionalized bending mold parts constructed in accordance with the invention have extremely smooth uniform shaping surfaces and are capable of continuous operation in a highly heated atmosphere without adverse effects on the surface of the mold parts.

It is to be understood that the form of the invention herewith shown and described is to be taken as an illustrative embodiment only of the same, and that various changes in the shape, size and arrangement of parts, as well as various procedural changes may be restored to without departing from the spirit of the invention.

We claim:

1. A bending mold part comprising a body portion with a surface thereon that conforms generally in contour to the curvature desired in a glass sheet to be bent, a refractory insulating cover material for said mold part spaced from said surface and having an outer exposed surface conforming accurately in contour to said desired curvature and against which said glass sheet is adapted to be bent, and a layer of material comprising a cured silicone polymer filling the space between said mold part and said cover material and bonding the same together.

2. An article as defined in claim 1 in which said bending mold part is of the open ring type and made up of a plurality of spaced sections arranged in end-to-end relation, and the filled space between said mold part and said cover material is from about 1/16 to about 1/8 inch thick.

3. An article as defined in claim 1, wherein said cover material comprises short fibers of high-purity alumina and silica formed into a mat and impregnated with colloidal silica.

4. A method of providing a heat resisting shaping surface on a bending mold part having a surface conforming generally in coutour to the curvature desired in a finished bent glass sheet, comprising supporting a refractory insulating cover material with its supported surface conforming accurately in contour to said desired curvature, applying a layer of adhesive material on the unsupported surface of said cover material, forcing the surface of said bending mold part against said adhesive layer to a position adjacent to but spaced from said cover material, and curing said adhesive to bond said cover material to said bending mold part.

5. A method as defined in claim 4, wherein said adhesive comprises a high molecular weight silicone elastomer.

6. A method as defined in claim 4, wherein said adhesive comprises a reactive silicone polymer, a catalyst and a thickening agent.

7. A method of forming an insulated shaping surface on a bending mold as defined in claim 6, wherein said silicone polymer comprises di-methyl polysiloxane.

8. A method of forming an insulated shaping surface on a bending mold as defined in claim 6, wherein said silicone polymer is a vinyl-containing methyl silicone.

9. A method of forming an insulated shaping surface on a bending mold as defined in claim 6, wherein said thickening agent comprises finely divided silica.

10. A method of forming an insulated shaping surface on a bending mold as defined in claim 6, wherein said thickening agent is milled fiber glass.

11. A method as defined in claim 4, wherein said adhesive consists of 0.5 part by weight of a di-butyl tin laurate catalyst, 99.5 parts by weight of di-methyl polysiloxane, and 80 parts by weight of finely divided silica having a mesh size of 200 to 400.

12. A method as defined in claim 4, wherein said adhesive consists of 0.8 part by weight of di-tert butyl peroxide, 100 parts by weight of a vinyl-containing silicone gum stock and 40 parts by weight of finely divided silica.

13. A method as defined in claim 4, wherein a layer of adhesive is applied to the surface of said cover to a thickness of about 3/16 inch to 1/4 inch.

References Cited

UNITED STATES PATENTS

| | | | |
|---|---|---|---|
| 2,739,640 | 3/1956 | Brinker et al. | 156—212 |
| 3,328,151 | 6/1967 | Richardson | 65—287 |
| 3,329,494 | 7/1967 | Carson et al. | 65—275 XR |
| 3,418,098 | 12/1968 | Kirkman | 65—288 XR |
| 3,017,318 | 1/1962 | Labino et al. | 162—152 |
| 3,024,131 | 3/1962 | Hutchinson | 117—75 |
| 3,070,559 | 12/1962 | Nitzsche et al. | 260—18 |
| 3,137,558 | 6/1964 | Oberstar | 65—288 |
| 3,146,799 | 9/1964 | Fekete | 138—125 |
| 3,379,607 | 4/1968 | Foster et al. | 161—207 |

JOHN T. GOOLKASIAN, Primary Examiner

D. J. FRITSCH, Assistant Examiner

U.S. Cl. X.R.

65—102; 156—212, 329